US008547646B2

(12) United States Patent
Kim (10) Patent No.: US 8,547,646 B2
(45) Date of Patent: Oct. 1, 2013

(54) COMPACT ZOOM LENS (75) Inventor: Dong-woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 13/084,645

(22) Filed: Apr. 12, 2011

(65) Prior Publication Data

US 2012/0057248 A1 Mar. 8, 2012

(30) Foreign Application Priority Data

Sep. 7, 2010 (KR) .................. 10-2010-0087664

(51) Int. Cl.
*G02B 15/14* (2006.01)
(52) U.S. Cl.
USPC .......................................... 359/694; 359/686
(58) Field of Classification Search
USPC ................................................ 359/694, 686
See application file for complete search history.

(56) References Cited

U.S. PATENT DOCUMENTS

| 2008/0062532 A1 | 3/2008 | Iwama |
| 2010/0060993 A1 | 3/2010 | Kanai et al. |
| 2010/0321792 A1* | 12/2010 | Yamagami ................ 359/687 |

FOREIGN PATENT DOCUMENTS

| JP | 2008-070519 A | 3/2008 |
| JP | 2008-241794 A | 10/2008 |
| JP | 2010-061007 A | 3/2010 |

* cited by examiner

*Primary Examiner* — James Jones
(74) *Attorney, Agent, or Firm* — Drinker Biddle & Reath LLP (57) ABSTRACT

A zoom lens includes, in a sequence from an object side to an image side, a first lens group having a negative refractive power and comprising two lenses; a second lens group having a positive refractive power; a stop disposed on the image side of the second lens group; and a third lens group having a positive refractive power, wherein: during zooming from a wide angle position to a telephoto position, an interval between the first lens group and the second lens group decreases, and an interval between the second lens group and the third lens group increases.

11 Claims, 9 Drawing Sheets

COMPACT ZOOM LENS

CROSS-REFERENCE TO RELATED PATENT APPLICATION

This application claims the benefit of Korean Patent Application No. 10-2010-0087664, filed on Sep. 7, 2010, in the Korean Intellectual Property Office, the disclosure of which is incorporated herein in its entirety by reference.

BACKGROUND

The invention relates to a zoom lens that is compact and performs high magnification.

Optical imaging devices such as digital cameras or digital camcorders that use image pickup devices, such as charge coupled devices (CCDs) or complementary metal-oxide semiconductors (CMOSs), are widely used. These devices may require compact zoom lenses that have high performance and high magnification.

A lens having three lens groups, namely, a negative lens group, a positive lens group, and another positive lens group, is generally used to satisfy the need for high magnification and miniaturization. However, several difficulties exist in increasing zoom magnification and also securing high performance such as aberration correction or the like.

For example, if the number of lenses in the second lens group is increased to 4 or more, chromatic aberration may be easily corrected, but attaining zoom magnification is difficult and formation of an ultra-compact zoom lens is difficult due to the large number of lenses. Moreover, although a zoom lens designed to form a high magnification of 5× or greater has been proposed, miniaturization of the zoom lens is difficult due to a large change in a distance between the second lens group and a third lens group occurring during zooming from a wide angle position to a telephoto position.

In general, either miniaturization or cost-reduction is sacrificed in many cases to accomplish high optical performance and high zoom magnification. Accordingly, various design techniques capable of achieving both the miniaturization and the cost-reduction have been developed.

SUMMARY

Embodiments of the invention provide a zoom lens that is compact and performs high magnification.

According to an embodiment of the invention, there is a zoom lens comprising, in a sequence from an object side to an image side: a first lens group having a negative refractive power and comprising two lenses; a second lens group having a positive refractive power; a stop disposed on the image side of the second lens group; and a third lens group having a positive refractive power, wherein: during zooming from a wide angle position to a telephoto position, an interval between the first lens group and the second lens group decreases, and an interval between the second lens group and the third lens group increases, and the zoom lens satisfies the following expressions:

$$4 \leq f_t/f_w \leq 6$$

$$3.0 \leq (D_{2t}-D_{2w})/f_w \leq 4.2$$

where $f_w$ and $f_t$ denote an overall focal length at a wide angle position and an overall focal length at a telephoto position, respectively, $D_{2t}$ and $D_{2w}$ denote a distance between a surface of the second lens group closest to the image side and a surface of the third lens group closest to the object side at the telephoto position and a distance between the surface of the second lens group closest to the image side and the surface of the third lens group closest to the object side at the wide angle position, respectively.

A lens disposed second from the object side from among the lenses of the first lens group may be an aspherical lens of which at least one surface is aspherical, and the zoom lens may satisfy the following expression:

$$2.0 \leq N2 \leq 2.3$$

where N2 denotes the refractive index at a line d of a lens located second from the object side from among the lenses of the first lens group.

A lens disposed first from the object side from among the lenses of the first lens group may be a spherical lens.

A difference between the Abbe's numbers of the two lenses of the first lens group may be 20 or greater.

A lens disposed first from the object side from among the lenses of the second lens group may be an aspherical lens of which at least one surface is aspherical.

The second lens group may include a doublet lens.

The second lens group may include, sequentially arranged from the object side, an aspherical lens of which two surfaces are aspherical and a doublet lens.

The third lens group may include a single aspherical lens of which two surfaces are aspherical.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The invention will now be described more fully with reference to the accompanying drawings, in which exemplary embodiments of the invention are shown. In the drawings, like reference numerals denote like elements, and the size or thickness of elements may be exaggerated for clarity.

Figure 1:
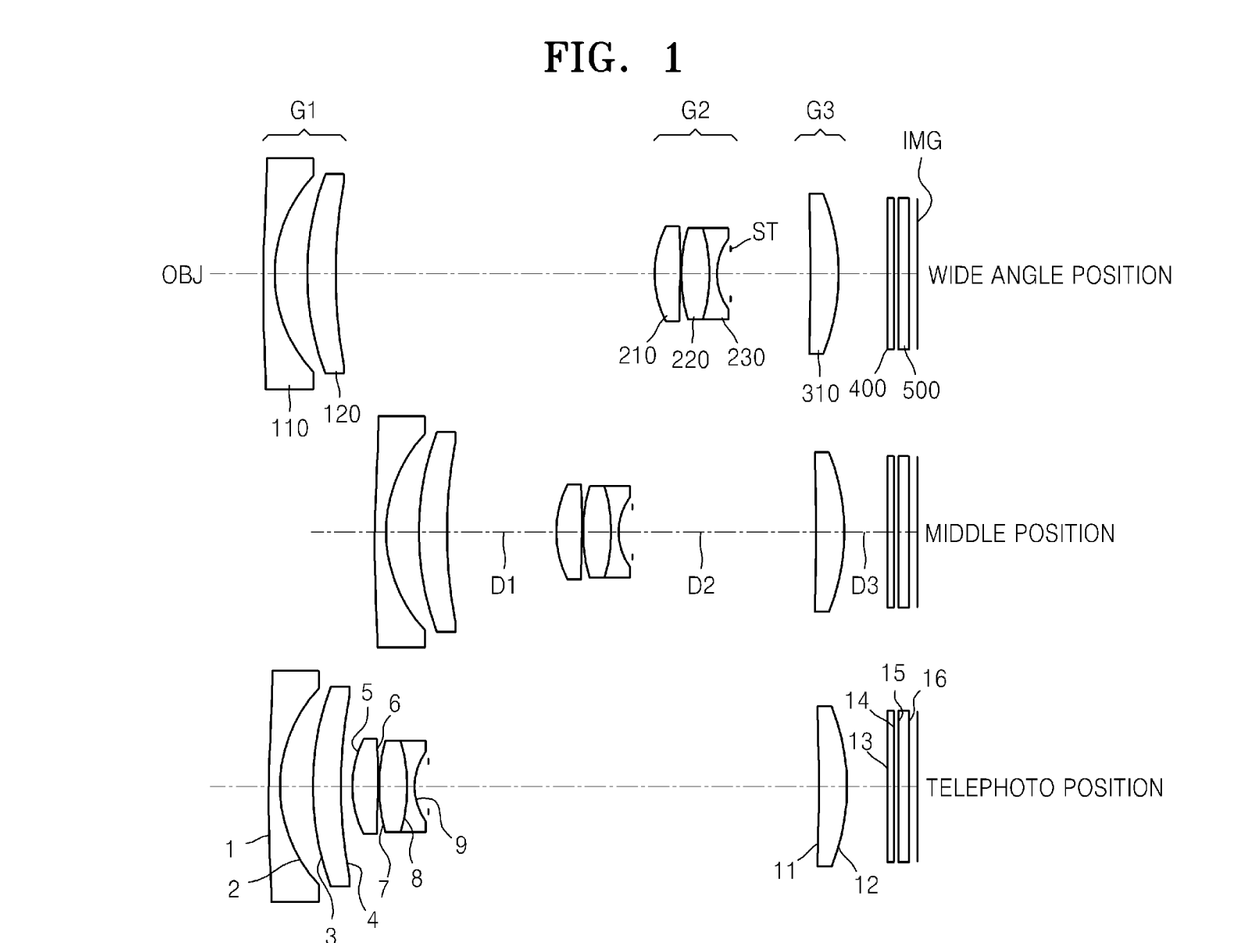
FIG. 1 is a pictorial diagram of optical arrangements of a zoom lens at a wide angle position, at a middle position, and at a telephoto position, according to an embodiment of the invention.
Figure 3:
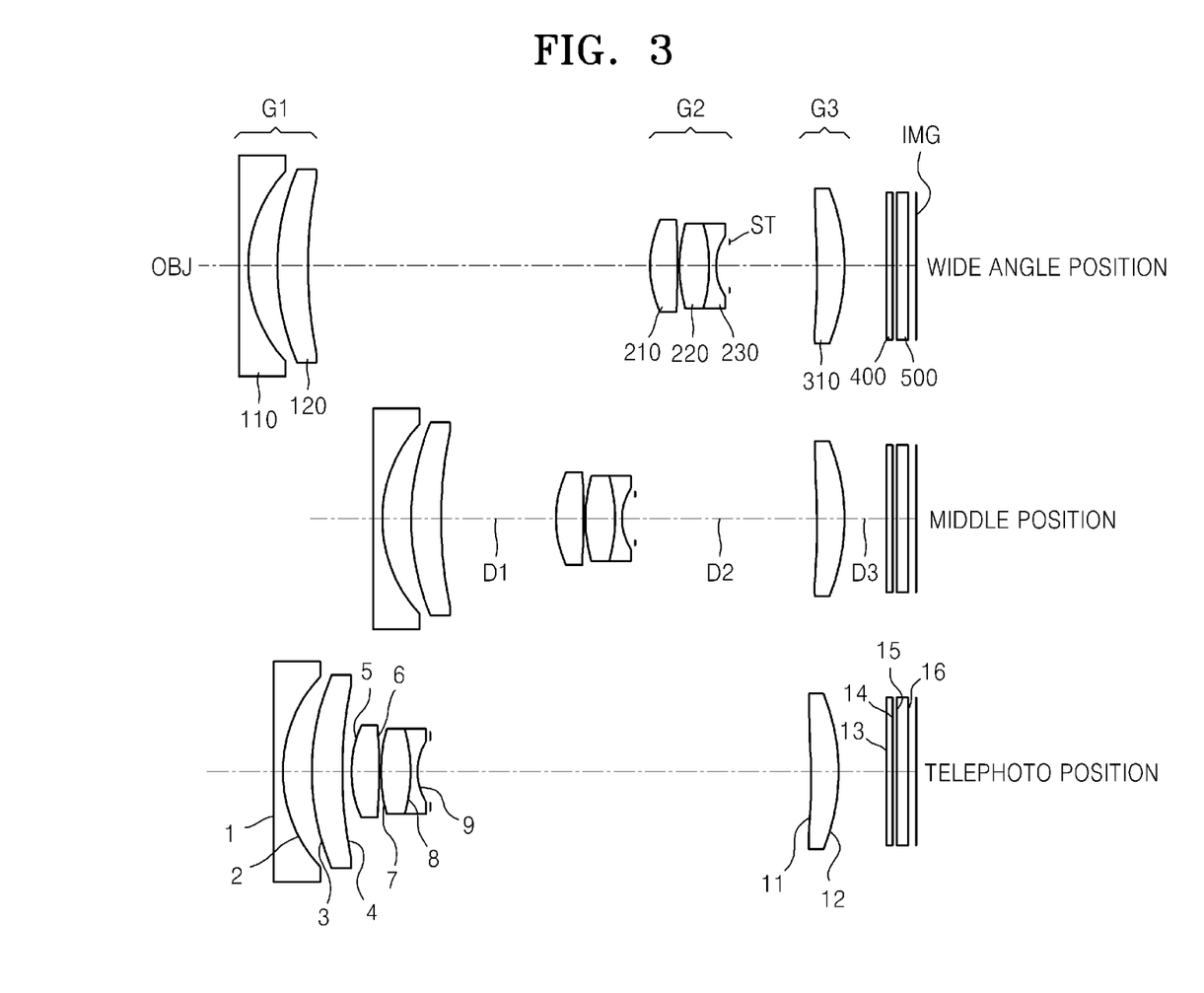
FIG. 3 is a pictorial diagram of optical arrangements of a zoom lens at a wide angle position, at a middle position, and at a telephoto position, according to another embodiment of the invention.
Figure 5:
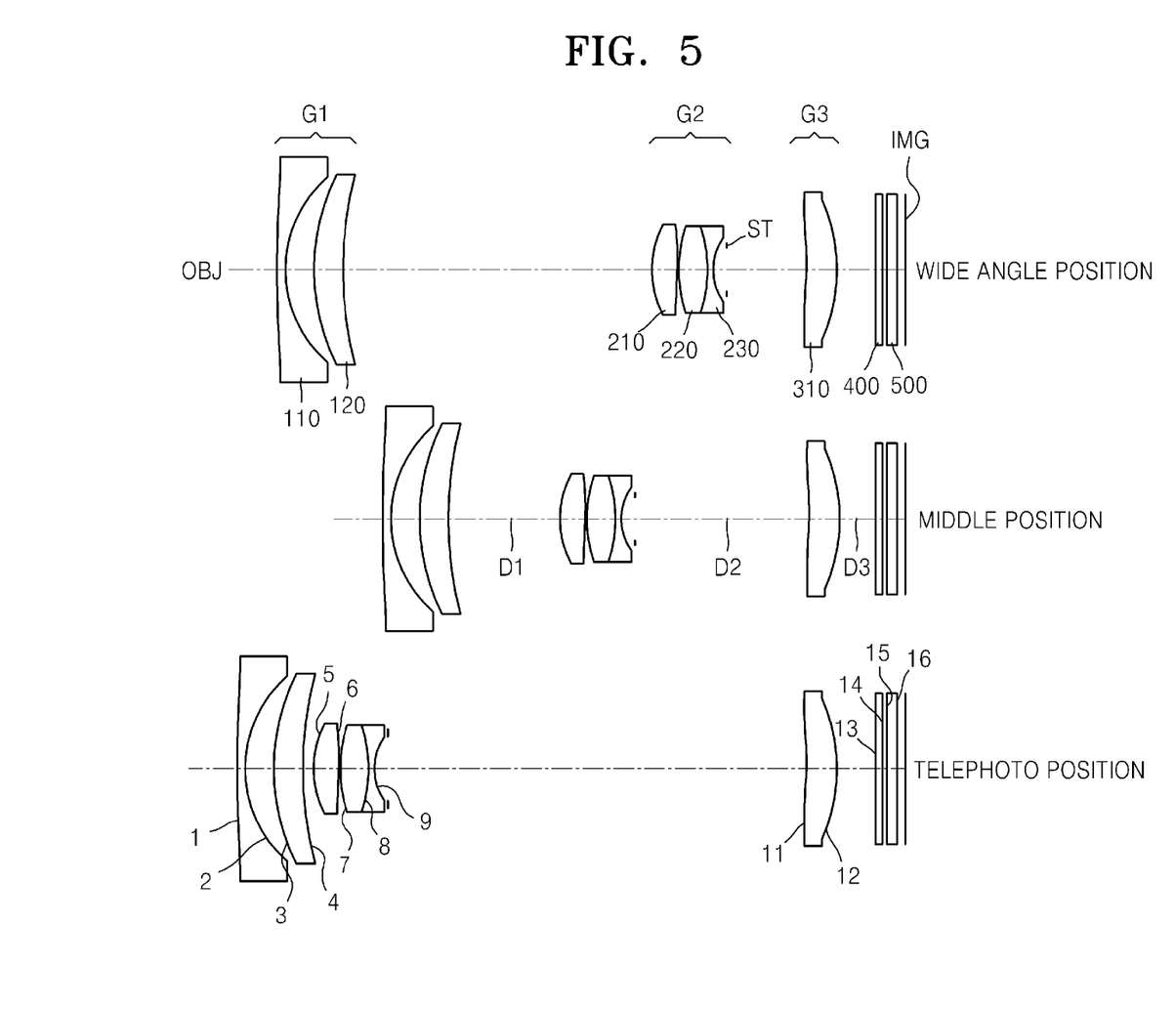
FIG. 5 is a pictorial diagram of optical arrangements of a zoom lens at a wide angle position, at a middle position, and at a telephoto position, according to another embodiment of the present invention.

FIGS. 1, 3, and 5 illustrate optical arrangements of zoom lenses according to embodiments 1 through 3 of the invention. Embodiments 1 through 3 are not exhaustive of the possible embodiments of the invention.

Referring to FIGS. 1, 3, and 5, the zoom lenses include a first lens group G1 having a negative refractive power, a second lens group G2 having a positive refractive power, and a third lens group G3 having a positive refractive power, which are sequentially arranged in the direction from an object side to an image side. A stop ST is disposed on the image side of the second lens group G2, and an infrared blocking filter 400 and a cover glass 500 are disposed between the third lens group G3 and an image plane IMG. When zooming is performed from a wide angle position to a telephoto position, the first, second, and third lens groups G1, G2, and G3 move so that a distance between the first and second lens groups G1 and G2 decreases and a distance between the second and third lens groups G2 and G3 increases. Image plane movement and focus location correction are performed by the third lens group G3.

The zoom lenses according to embodiments 1 through 3 may satisfy Expression (1):

$$4 \leq f_t/f_w \leq 6 \quad \text{Expression 1}$$

where $f_t$ and $f_w$ denote an overall focal length at the telephoto position and an overall focal length at the wide angle position, respectively.

Expression 1 relates to magnification. At a request for high magnification, a lower limit in Expression 1 is set to be 4. When the magnification exceeds an upper limit in Expression 1, chromatic aberration at the telephoto position makes it difficult to secure performance, and the amount of movement of each lens group is greatly increased during zooming. Thus, forming a small lens barrel is difficult. The zoom lenses according to embodiments 1 through 3 may also satisfy Expression (2):

$$3.0 \leq (D_{2t} - D_{2w})/f_w \leq 4.2 \quad \text{Expression 2}$$

where $D_{2t}$ and $D_{2w}$ denote a distance between a surface of the second lens group G2 closest to the image side and a surface of the third lens group G3 closest to the object side at the telephoto position and a distance between the surface of the second lens group G2 closest to the image side and the surface of the third lens group G3 closest to the object side at the wide angle position, respectively, and $f_w$ denotes the overall focal length at the wide angle position.

Expression 2 defines a ratio of a change in the distance between the second and third lens groups G2 and G3 during zooming from the wide angle position to the telephoto position to the overall focal length at the wide angle position. When the ratio exceeds an upper limit in Expression 2, the amount of movement of the second lens group G2 is greatly increased during zooming compared with the overall focal length at the wide angle position, and thus it is difficult to form a small lens barrel. When the ratio is less than a lower limit in Expression 2, the amount of movement of the second lens group G2 is decreased during zooming, and thus it is advantageous to form a small lens barrel. However, the focal length of the second lens group G2 becomes much less than that of the first or third lens group G1 or G3, and thus the refractive indices of the lenses of the second lens group G2 are increased, whereby chromatic aberration correction at the telephoto position is difficult.

The zoom lenses according to embodiments 1 through 3 may also satisfy Expression (3):

$$2.0 \leq N2 \leq 2.3 \quad \text{Expression 3}$$

where N2 denotes the refractive index at a line d (587.56 nm) of a lens located second from the object side from among the lenses of the first lens group G1.

Expression 3 limits the refractive index of the lens of the first lens group G1 that is located second from the object side. A highly-refractive material is used to form the first lens group G1 in order to make the zoom lens compact and to effectively correct chromatic aberration.

A structure of each lens group will now be described in greater detail.

The first lens group G1 may include two lenses, for example, a first lens 110, which is a negative meniscus lens convex toward the object side, and a second lens 120, which is a positive meniscus lens convex toward the object side, which are sequentially arranged from the object side.

In embodiments 1 through 3, the first lens 110, which is closest to the object side from among the lenses of the first lens group G1, is a spherical lens. In many existing negative-positive-positive type optical systems, a lens of the first lens group G1 which is closest to the object side is formed of a highly-refractive aspherical lens so as to facilitate corrections of astigmatism at a wide angle position and distortion. Since it is generally the case that the lens of the first lens group G1 which is closest to the object side has the largest outer diameter from among the lenses of the entire optical system, the use of the highly-refractive aspherical lens increases the manufacturing costs of the optical system. However, due to recent development of software technology, distortion can be corrected by a software process. Thus, in embodiments 1 through 3, a spherical lens is used as the lens of the first lens group G1 which is closest to the object side, thereby reducing the costs of manufacturing the optical system. Moreover, a highly-refractive aspherical lens having a refractive index of about 2.1 may be used as the second lens 120, which is the last lens of the first lens group G1. This leads to formation of a small optical system, and facilitates corrections of lateral chromatic aberration at a telephoto position and astigmatism. Because the second lens 120 uses the highly-refractive aspherical lens, correction of astigmatism in a periphery at the wide-angle position becomes easy, and a magnitude of incident light upon the periphery at the wide-angle position may be decreased. Thus, it becomes easy to reduce the outer diameters of the lenses of the first lens group G1, and thus reducing the size of a lens barrel becomes easier. Moreover, a difference between the Abbe's numbers of the first and second lenses 110 and 120 of the first lens group G1 may be about 20 or greater, so that chromatic aberration is easily corrected.

The second lens group G2 may include a third lens 210, which is a positive biconvex lens, a fourth lens 220, which is a positive biconvex lens, and a fifth lens 230, which is a negative biconcave lens, which are sequentially arranged from the object side to the image side. The third lens 210 may use an aspherical surface in both lens surfaces in order to minimize spherical aberration. The fourth and fifth lenses 220 and 230 may be formed as a doublet lens in order to minimize lateral chromatic aberration that occurs during zooming.

A stop ST is disposed to be closest to the image side of the second lens group G2. Since this structure is proposed to minimize the interval between the first and second lens groups G1 and G2 at the telephoto position, the zoom lens according to the present embodiment has a 3-group type small structure and thus achieves high magnification which is 4.5× or greater.

The third lens group G3 may include a seventh lens 310, which is a positive lens. The seventh lens 310 may be a plastic aspherical lens having a refractive index of about 1.55 or less, and thus may minimize a change of field curvature at a periphery according to a change of an object distance without increasing an angle at which light is incident upon an image plane. Moreover, the manufacturing costs for the optical system may be reduced.

The term "aspherical (ASP)" described in embodiments 1 through 3 of the present invention is defined as follows:

$$x = \frac{c'y^2}{1+\sqrt{1-(K+1)c'^2h^2}} + Ah^4 + Bh^6 + Ch^8 + Dh^{10} \quad \text{Expression 4}$$

where x denotes a distance from a vertex of a lens along an optical axis, y denotes a distance from the vertex of the lens in a direction perpendicular to the optical axis, K denotes a conic constant, A, B, C, and D denote aspherical coefficients, and c' denotes a reciprocal (1/R) of the radius of curvature of the vertex of the lens. Lens data according to the embodiments of the present invention will now be described in detail. In the lens data, STO denotes a stop and ASP denotes an aspherical surface. In the lens data, f denotes a focal length of the entire zoom lens, Fno denotes the F number, 2ω denotes a viewing angle, and D1, D2, and D3 are variable distances between lenses.

<Embodiment 1> f; 4.75~10.44~22.55 Fno; 3.4~5.37~5.99 2ω; 78.45~40.72~19.50

| | RDY | THI | Nd | Vd |
|---|---|---|---|---|
| OBJ: | INFINITY | INFINITY | | |
| 1: | 132.42256 | 0.500000 | 0.500000 | 40.8692 |
| 2: | 7.25605 | 1.754430 | | |
| 3: | 10.77472 | 1.457778 | 2.09880 | 16.753 |
| ASP: | | | | |
| K: −1.000000 | | | | |
| A: −.232434E−03 B: −.105435E−04 C: 0.126336E−06 D: 0.252182E−08 | | | | |
| 4: | 15.40981 | D1 | | |
| ASP: | | | | |
| K: −1.000000 | | | | |
| A: −.436711E−03 B: −.132854E−05 C: 0.386013E−06 D: −.300920E−08 | | | | |
| 5: | 5.49337 | 1.315539 | 1.659455 | 54.9919 |
| ASP: | | | | |
| K: −3.583023 | | | | |
| A: 0.179571E−02 B: −.858672E−04 C: 0.159945E−05 D: −.283532E−07 | | | | |
| 6: | −36.65502 | 0.100000 | | |
| ASP: | | | | |
| K: −1.000000 | | | | |
| A: 0.437856E−03 B: −.185720E−04 C: 0.854802E−05 D: −.746410E−07 | | | | |
| 7: | 9.41859 | 1.445545 | 1.883000 | 40.8054 |
| 8: | −7.55363 | 0.400000 | 1.679257 | 29.6212 |
| 9: | 3.38429 | 0.700000 | | |
| STO: | INFINITY | D2 | | |
| 11: | −135.65149 | 1.526708 | 1.531200 | 56.5100 |
| ASP: | | | | |
| K: −1.000000 | | | | |
| A: −.377168E−03 B: −.750192E−05 C: 0.190448E−05 D: 0.491838E−08 | | | | |
| 12: | −9.57616 | D3 | | |
| ASP: | | | | |
| K: −1.000000 | | | | |
| A: −.124052E−03 B: −.655829E−02 C: 0.119963E−05 D: 0.358485E−07 | | | | |
| 13: | INFINITY | 0.300000 | 1.516798 | 64.1983 |
| 14: | INFINITY | 0.300000 | | |
| 15: | INFINITY | 0.500000 | 1.516798 | 64.1983 |
| 16: | INFINITY | 0.500000 | | |
| IMG: | INFINITY | | | |

| | Wide angle position | Middle position | Telephoto position |
|---|---|---|---|
| D1 | 16.7552 | 5.7353 | 0.61 |
| D2 | 4.1512 | 9.6854 | 20.4702 |
| D3 | 2.9398 | 2.4962 | 2.1026 |

Figure 2A:
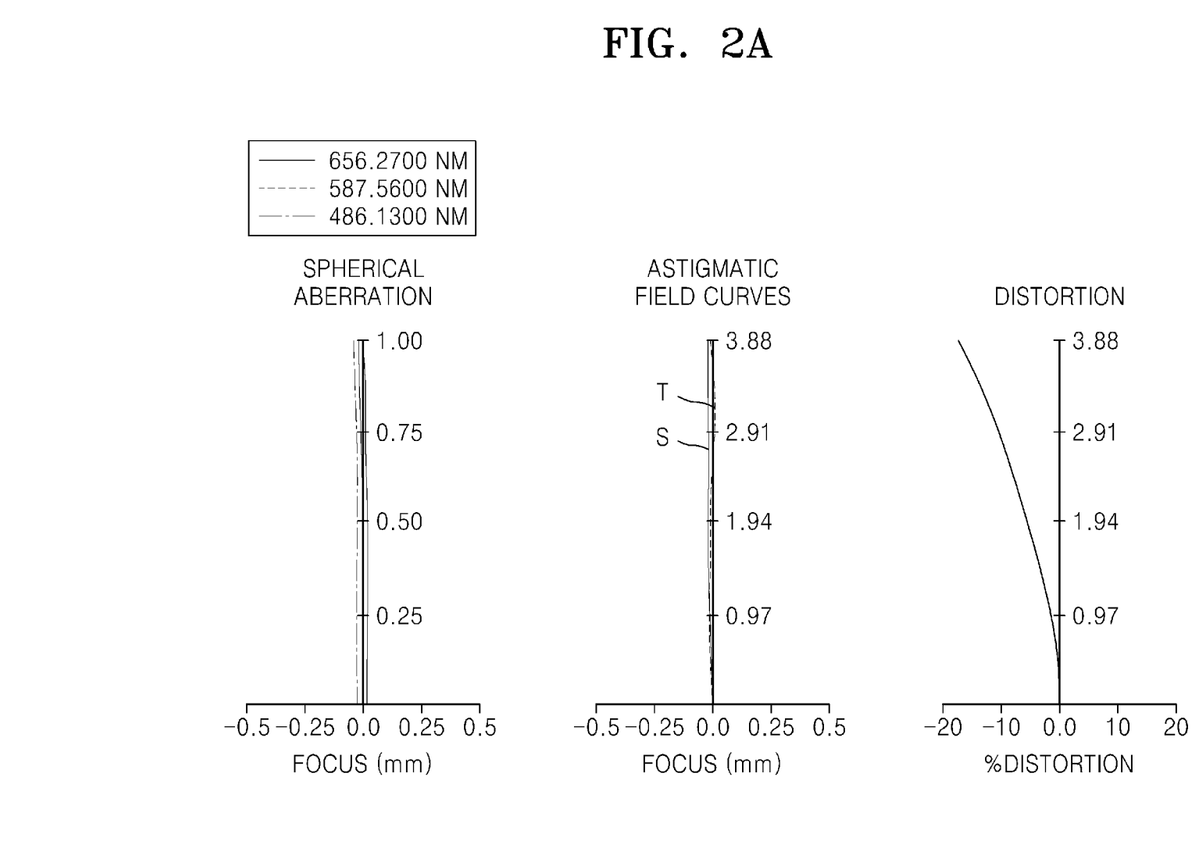
FIGS. 2A and 2B are graphical diagrams of longitudinal spherical aberration, astigmatic field curves, and distortion of the zoom lens illustrated in FIG. 1, at the wide angle position and at the telephoto position, respectively.
Figure 2B:
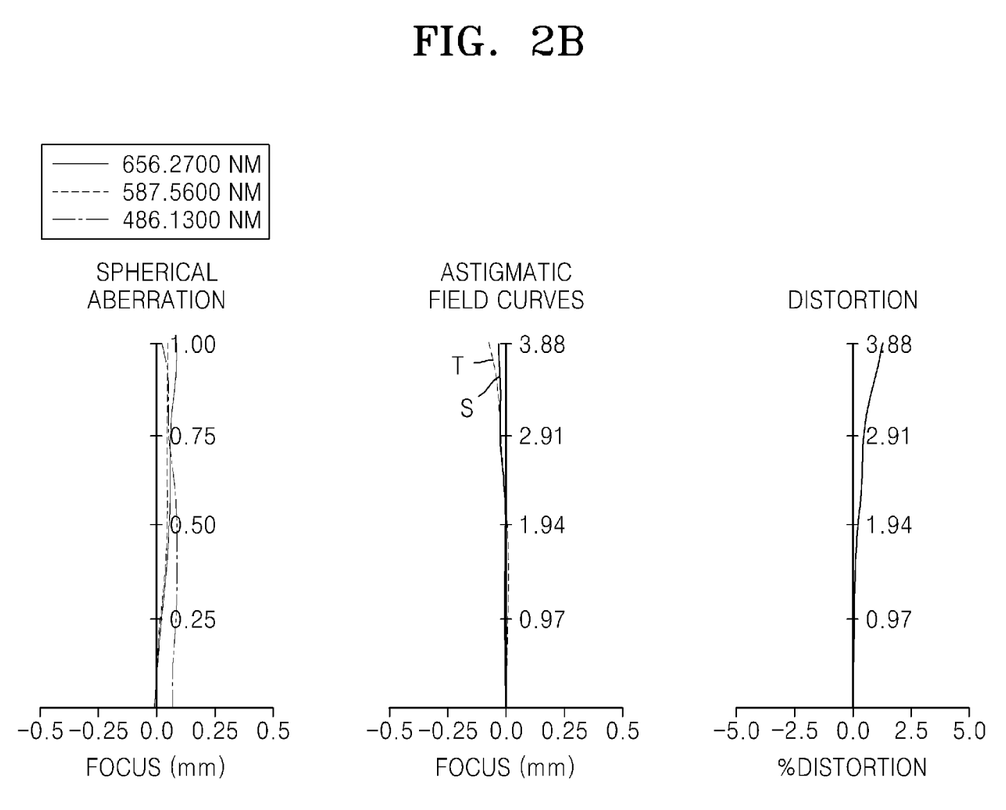

FIGS. 2A and 2B each illustrate longitudinal spherical aberration, astigmatic field curves, and distortion of the zoom lens illustrated in FIG. 1, at a wide angle position, at a middle position, and at a telephoto position. The longitudinal spherical aberration is shown for light beams having wavelengths of 656.27 nm, 587.56 nm, and 486.13 nm. In the astigmatism, T and S denote a curve on a tangential surface and a curve on a sagittal surface, respectively.

<Embodiment 2> f; 5.04~11.09~23.95 Fno; 3.64~5.52~6.44 2ω; 75.08~38.50~18.38

| | RDY | THI | Nd | Vd |
|---|---|---|---|---|
| OBJ: | INFINITY | INFINITY | | |
| 1: | 413.40668 | 0.500000 | 1.890397 | 35.2249 |
| 2: | 7.33036 | 1.510654 | | |
| 3: | 10.35433 | 1.606110 | 2.0988 | 16.753 |
| ASP: | | | | |
| K: −1.000000 | | | | |
| A: −.190605E−03 B: −.474056E−05 C: 0.243496E−06 D: −.313685E−08 | | | | |
| 4: | 16.26243 | D1 | | |
| ASP: | | | | |
| K: −1.000000 | | | | |
| A: −.402146E−03 B: −.382411E−05 C: 0.277395E−06 D: −.562687E−08 | | | | |
| 5: | 5.51674 | 1.428697 | 1.589130 | 61.2000 |
| ASP: | | | | |
| K: −3.627080 | | | | |
| A: 0.179689E−02 B: −.787258E−04 C: 0.263601E−05 D: −.168080E−06 | | | | |
| 6: | −30.79599 | 0.100000 | | |
| ASP: | | | | |
| K: −1.000000 | | | | |
| A: 0.286809E−03 B: −.488853E−05 C: 0.346043E−06 D: −.137397E−06 | | | | |
| 7: | 7.50894 | 1.538652 | 1.836069 | 44.0131 |
| 8: | −8.61441 | 0.400000 | 1.671977 | 31.4769 |
| 9: | 3.26451 | 0.700000 | | |
| STO: | INFINITY | D2 | | |
| 11: | −46.52710 | 1.415888 | 1.531200 | 56.5100 |
| ASP: | | | | |
| K: −1.000000 | | | | |
| A: −.472940E−03 B: −.605292E−05 C: 0.285620E−05 D: −.836964E−08 | | | | |
| 12: | −9.82793 | D3 | | |
| ASP: | | | | |
| K: −1.000000 | | | | |
| A: −.436722E−03 B: −.396137E−05 C: 0.169117E−05 D: 0.464891E−07 | | | | |
| 13: | INFINITY | 0.300000 | 1.516798 | 64.1983 |
| 14: | INFINITY | 0.300000 | | |
| 15: | INFINITY | 0.500000 | 1.516798 | 64.1983 |
| 16: | INFINITY | 0.500000 | | |
| IMG: | INFINITY | | | |

| | Wide angle position | Middle position | Telephoto position |
|---|---|---|---|
| D1 | 18.2761 | 6.1650 | 0.61 |
| D2 | 4.6801 | 9.8188 | 20.3133 |
| D3 | 2.2637 | 2.1361 | 2.4348 |

Figure 4A:
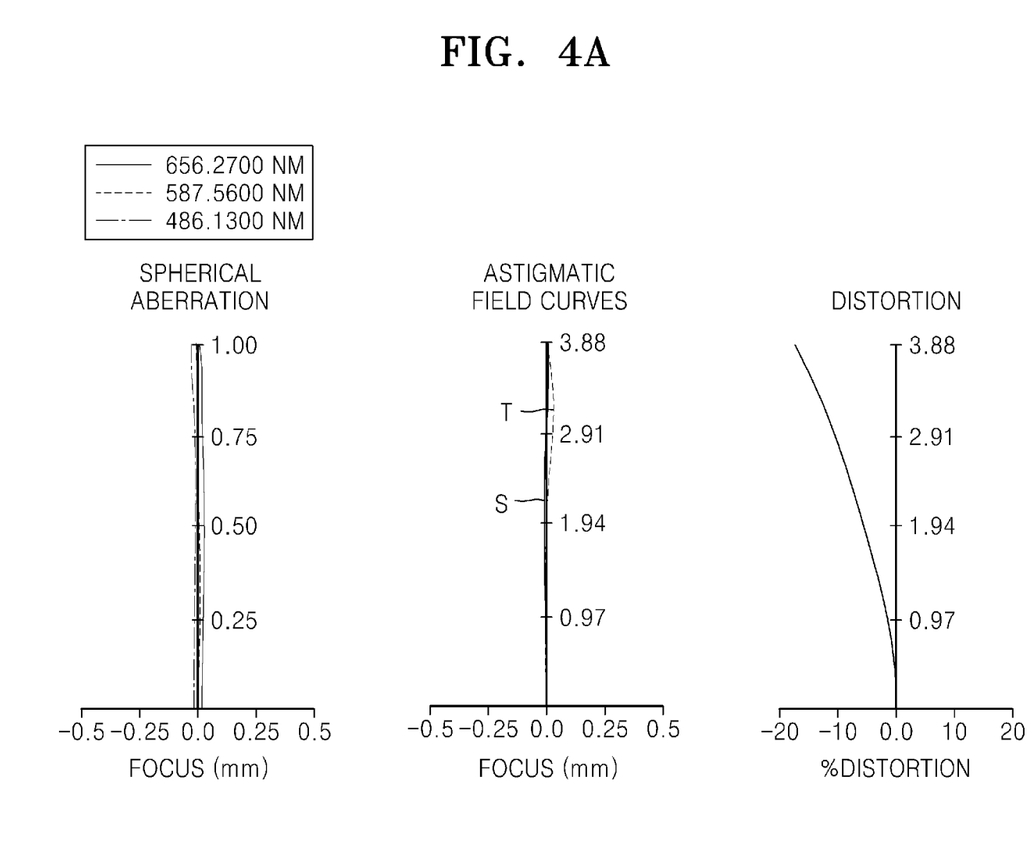
FIGS. 4A and 4B are graphical diagrams of longitudinal spherical aberration, astigmatic field curves, and distortion of the zoom lens illustrated in FIG. 3, at the wide angle position and at the telephoto position, respectively.
Figure 4B:
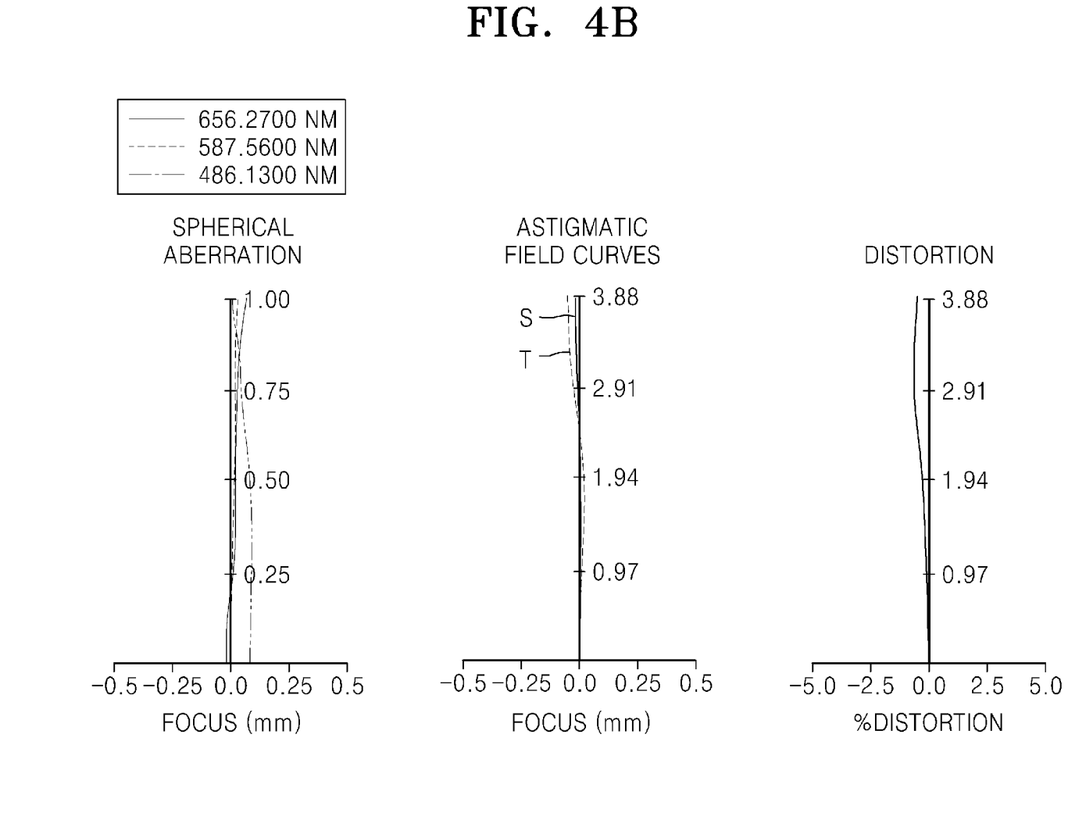

FIGS. 4A and 4B each illustrate longitudinal spherical aberration, astigmatic field curves, and distortion of the zoom lens illustrated in FIG. 3, at a wide angle position, at a middle position, and at a telephoto position.

<Embodiment 3> f; 4.63~10.19~25.00 Fno; 3.41~5.24~6.84 2ω; 79.84~41.64~17.62

| | RDY | THI | Nd | Vd |
|---|---|---|---|---|
| OBJ: | INFINITY | INFINITY | | |
| 1: | 96.19787 | 0.500000 | 1.886172 | 38.1979 |
| 2: | 6.69173 | 1.499910 | | |
| 3: | 9.19681 | 1.527165 | 2.0988 | 16.753 |
| ASP | | | | |
| K: −1.000000 | | | | |
| A: −.320181E−03 B: −.412425E−07 C: 0.209251E−06 D: −.427566E−08 | | | | |

-continued f; 4.63~10.19~25.00 Fno; 3.41~5.24~6.84 2ω; 79.84~41.64~17.62

| | | | | |
|---|---|---|---|---|
| 4: | 12.78361 | D1 | | |
| ASP | | | | |
| K: −1.000000 | | | | |
| A: −.612973E−03 B: 0.318862E−05 C: 0.161835E−06 D: −.719243E−08 | | | | |
| 5: | 5.46607 | 1.339579 | 1.589130 | 61.2000 |
| ASP | | | | |
| K: −3.636493 | | | | |
| A: 0.181246E−02 B: −.818330E−04 C: 0.103039E−05 D: −.101967E−06 | | | | |
| 6: | −29.44015 | 0.100000 | | |
| ASP | | | | |
| K: −1.000000 | | | | |
| A: 0.345840E−03 B: −.162244E−04 C: 0.482313E−06 D: −.181589E−06 | | | | |
| 7: | 7.16448 | 1.450219 | 1.865187 | 41.9261 |
| 8: | −9.06671 | 0.400000 | 1.678397 | 30.5663 |
| 9: | 3.19571 | 0.700000 | | |
| STO: | INFINITY | D2 | | |
| 11: | −36.45094 | 1.617502 | 1.531200 | 56.5100 |
| ASP | | | | |
| K: −1.000000 | | | | |
| A: −.346772E−03 B: −.287908E−05 C: 0.383205E−05 D: −.218277E−07 | | | | |
| 12: | −7.95532 | D3 | | |
| ASP | | | | |
| K: −1.000000 | | | | |
| A: −.918250E−04 B: 0.248768E−04 C: −.356957E−06 D: 0.143644E−06 | | | | |
| 13: | INFINITY | 0.300000 | 1.516798 | 64.1983 |
| 14: | INFINITY | 0.300000 | | |
| 15: | INFINITY | 0.500000 | 1.516798 | 64.1983 |
| 16: | INFINITY | 0.500000 | | |
| IMG: | INFINITY | | | |

| | Wide angle position | Middle position | Telephoto position |
|---|---|---|---|
| D1 | 16.7060 | 6.0276 | 0.61 |
| D2 | 4.2423 | 9.4317 | 22.6106 |
| D3 | 2.1609 | 1.95 | 2.00 |

Figure 6A:
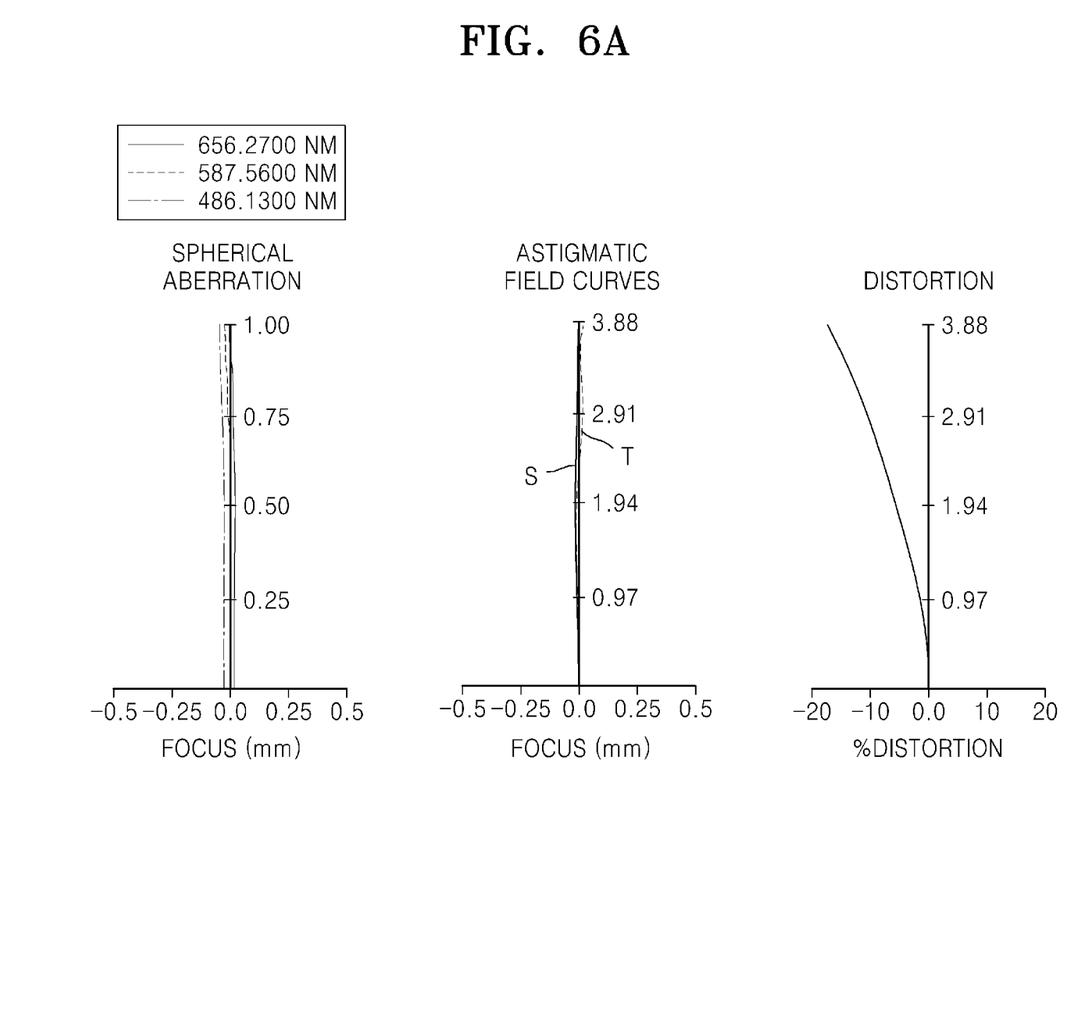
FIGS. 6A and 6B are graphical diagrams of longitudinal spherical aberration, astigmatic field curves, and distortion of the zoom lens illustrated in FIG. 5, at the wide angle position and at the telephoto position, respectively.
Figure 6B:
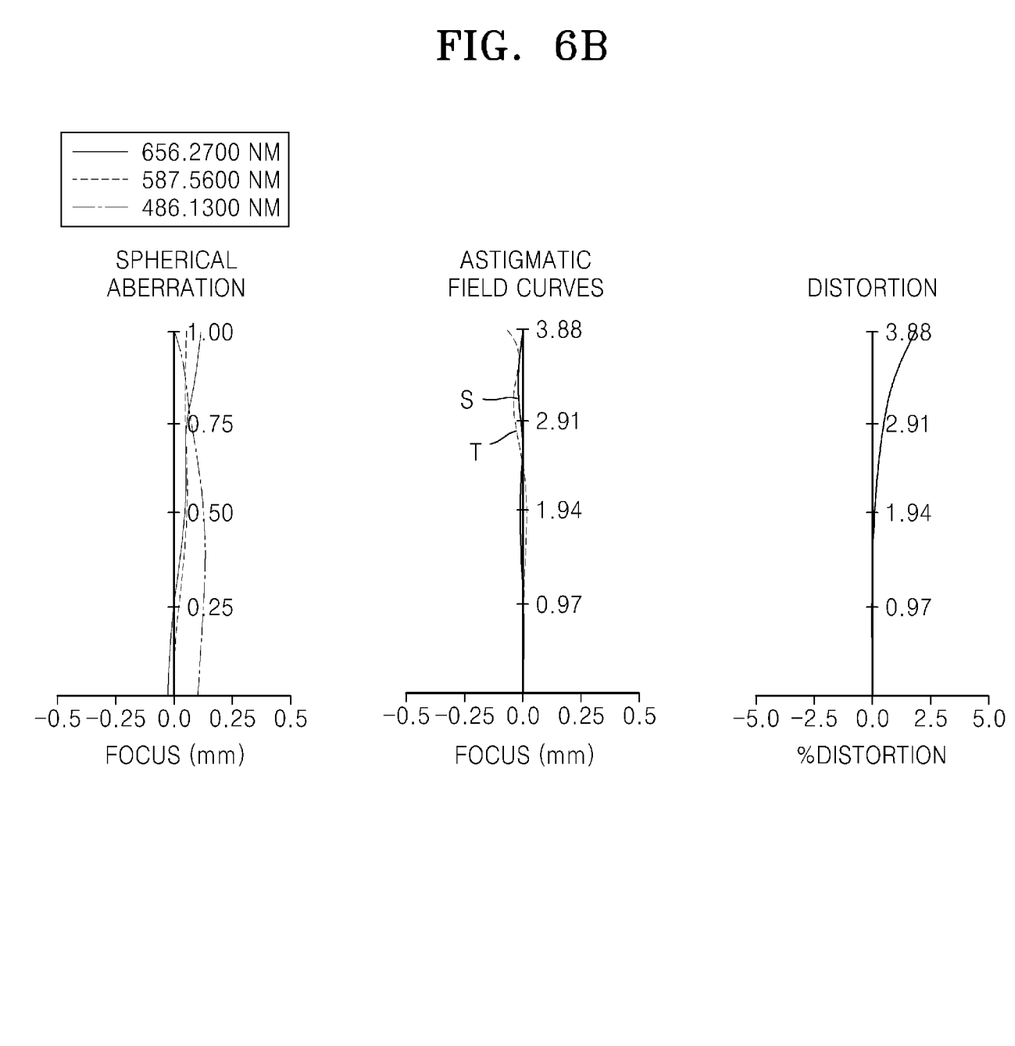

FIGS. 6A and 6B each illustrate longitudinal spherical aberration, astigmatic field curves, and distortion of the zoom lens illustrated in FIG. 5, at a wide angle position, at a middle position, and at a telephoto position. Table 1 below shows that embodiments 1 through 3 satisfy the above-described conditions.

TABLE 1

| Conditions | <Embodiment 1> | <Embodiment 2> | <Embodiment 3> |
|---|---|---|---|
| ft/fw | 4.75 | 4.75 | 5.4 |
| $(D_{2t} - D_{2w})/fw$ | 3.43 | 3.10 | 3.97 |
| N2 | 2.09880 | 2.09880 | 2.09880 |

The zoom lens according to the above-described embodiments has a small structure capable of being designed at low costs, and provides high magnification and good optical performance.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

What is claimed is:

1. A zoom lens comprising, in a sequence from an object side to an image side:
    a first lens group having a negative refractive power and comprising two lenses;
    a second lens group having a positive refractive power;
    a stop disposed on the image side of the second lens group; and
    a third lens group having a positive refractive power,
    wherein:
        during zooming from a wide angle position to a telephoto position, an interval between the first lens group and the second lens group decreases, and an interval between the second lens group and the third lens group increases, and the zoom lens satisfies the following expressions:

$$4 \le f_t/f_w \le 6$$

$$3.0 \le (D_{2t} - D_{2w})/f_w \le 4.2$$

where $f_w$ and $f_t$ denote an overall focal length at a wide angle position and an overall focal length at a telephoto position, respectively, and $D_{2t}$ and $D_{2w}$ denote a distance between a surface of the second lens group closest to the image side and a surface of the third lens group closest to the object side at the telephoto position and a distance between the surface of the second lens group closest to the image side and the surface of the third lens group closest to the object side at the wide angle position, respectively.

2. The zoom lens of claim 1, wherein a lens disposed second from the object side from among the lenses of the first lens group is an aspherical lens of which at least one surface is aspherical, and the zoom lens satisfies the following expression:

$$2.0 \leq N2 \leq 2.3$$

where N2 denotes the refractive index at a lined of a lens located second from the object side from among the lenses of the first lens group.

3. The zoom lens of claim 1, wherein a lens disposed first from the object side from among the lenses of the first lens group is a spherical lens.

4. The zoom lens of claim 2, wherein a lens disposed first from the object side from among the lenses of the first lens group is a spherical lens.

5. The zoom lens of claim 1, wherein a difference between the Abbe's numbers of the two lenses of the first lens group is 20 or greater.

6. The zoom lens of claim 1, wherein the third lens group comprises a single aspherical lens of which two surfaces are aspherical.

7. The zoom lens of claim 1, wherein a lens disposed first from the object side from among the lenses of the second lens group is an aspherical lens of which at least one surface is aspherical.

8. The zoom lens of claim 1, wherein the second lens group comprises a doublet lens.

9. The zoom lens of claim 1, wherein the second lens group comprises an aspherical lens of which two surfaces are aspherical and a doublet lens, which are sequentially arranged from the object side.

10. The zoom lens of claim 7, wherein a difference between the Abbe's numbers of the two lenses of the first lens group is 20 or greater.

11. The zoom lens of claim 7, wherein the third lens group comprises a single lens of which two surfaces are aspherical.

* * * * *